U. G. ROGERS.
RETAINER FOR BALL BEARINGS.
APPLICATION FILED MAY 9, 1913.

1,117,247.

Patented Nov. 17, 1914.

Witnesses:
Harry S. Gaither
Helen Freund

Inventor:
Ulysses G. Rogers
by Sheridan, Wilkinson, Scott & Richmond
Attys.

UNITED STATES PATENT OFFICE.

ULYSSES G. ROGERS, OF CHICAGO, ILLINOIS.

RETAINER FOR BALL-BEARINGS.

1,117,247.  Specification of Letters Patent.  Patented Nov. 17, 1914.

Application filed May 9, 1913. Serial No. 766,546.

*To all whom it may concern:*

Be it known that I, ULYSSES G. ROGERS, a citizen of the United States, residing at Chicago, in the county of Cook and State of Illinois, have invented certain new and useful Improvements in Retainers for Ball-Bearings, of which the following is a specification.

My invention relates in general to ball bearings, and more particularly to an improved retainer and spacer for the balls, and to an improved method of assembling the balls and retainer ring with the bearing rings.

The primary object of my invention is to provide a retainer ring for the balls of a ball bearing which will space the balls within, and permit them to freely rotate in, the raceway between the bearing rings, and in which the retainer will be held between the bearing rings in operative relation with the balls through its engagement with the balls themselves.

A further object of my invention is to provide an improved method for conveniently and efficiently assembling a retainer ring and the balls of a ball bearing in operative relation between the bearing rings.

My invention will be more fully disclosed hereinafter with reference to the accompanying drawings, in which the same is illustrated as embodied in a convenient and practical form, and in which—

Figure 1:
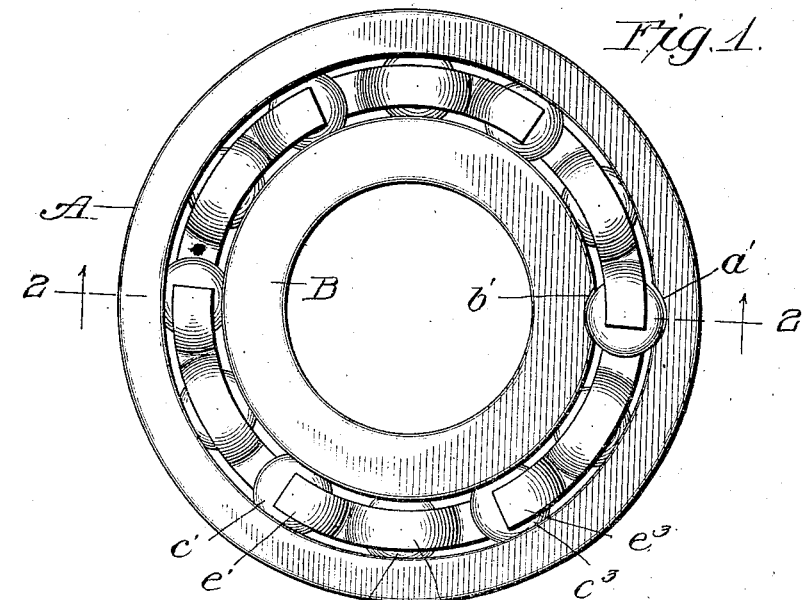
Figure 2:
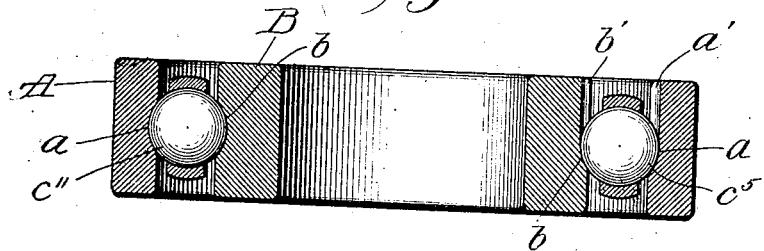
Figure 3:
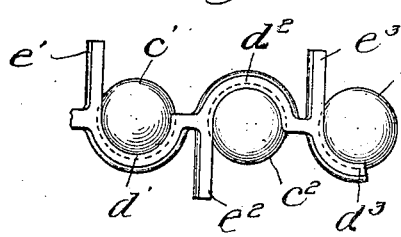
Figure 4:
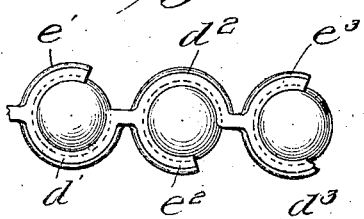

Figure 1 is an elevational view showing my improved retainer ring in operative relation to the balls interposed between the bearing rings. Fig. 2 is a cross sectional view, taken on the line 2—2 of Fig. 1. Fig. 3 is an elevational view of a portion of the retainer ring with the balls seated therein, before the keeper lugs have been bent around the balls; and Fig. 4 is a view similar to Fig. 3 in which the keeper lugs of the retainer ring have been bent around the balls seated in the adjacent recesses.

The same reference characters are used to designate the same parts in the several figures of the drawing.

Reference characters A and B designate the outer and inner bearing rings, between which the balls are interposed. The bearing rings are provided with circular shallow grooves $a$, $b$, which form a raceway between the inner surface of the outer bearing ring A and the outer surface of the inner bearing ring B in which the balls are located.

$a'$ and $b'$ designate the usual feed grooves extending laterally from the circular grooves $a$ and $b$, respectively, through which the balls are inserted into the raceway between the bearing rings.

My improved retainer ring is formed in a single piece, preferably of suitable cast metal, such, for instance, as brass, bronze, or the like. The main portion of the retaining ring is sinuous, so as to form curved recesses opening alternately at opposite sides of the ring.

$d'$ and $d^3$ indicate curved seats to receive balls $c'$ and $c^3$, such recesses opening toward one side of the retainer ring, while intermediate of such recesses are formed other recesses, such as $d^2$, which open to the opposite side of the retainer ring and in which are seated the intermediate balls $c^2$. Adjacent one side of each of the recesses in the retainer ring is a laterally projecting lug cast integral with the ring and adapted to be bent around the ball inserted in the adjacent recess. $e'$ and $e^3$ designate such laterally projecting lugs extending to one side of the retainer ring and adjacent the recesses $d'$ and $d^3$, and adapted to be bent around the balls $c'$ and $c^3$ located in such recesses, in the manner shown in Fig. 4. $e^2$ designates a similar laterally projecting lug extending to the opposite side of the retainer ring adjacent the recess $d^2$ therein and adapted to be bent around the ball $c^2$ inserted in such recess.

It will be understood that in the preferred embodiment of my invention illustrated in the drawing alternate recesses in the retainer ring open to one side thereof, while the intermediate recesses open to the opposite side of the ring, and that the laterally projecting lugs are arranged alternately on opposite sides of the ring, one of such lugs being located adjacent one side of each recess.

In assembling my improved retainer ring with the balls so as to space them between the inner and outer bearing rings, I first insert through the feed grooves $a'$ and $b'$ into the raceway, formed by the opposing circular grooves $a$ and $b$, a number of balls equal to the number of recesses opening at one side of the retainer ring. I then place the retainer ring between the bearing rings with the recesses opening at one side thereof around the balls which have already been inserted into the raceway. I then rotate the retainer ring relatively to the outer and inner bearing rings until the first recess in the upper side of the retainer ring registers with the feed grooves a' and b', and then insert through the feed grooves a ball which rests upon the registering recess in the retainer ring. The retainer ring is then moved until the next recess in the upper surface thereof registers with the feed grooves, when another ball is inserted through the feed grooves so as to rest upon such registering recess. This operation is continued until the balls have been inserted in all of the recesses on the upper side of the retainer ring. The oppositely projecting lugs on the retainer ring are then bent around the balls in the adjacent recesses.

It will be observed that owing to the sinuous character of the retainer ring it will be positively retained in engagement with the balls, even if no lugs were provided to be bent around the balls, inasmuch as the arrangement of some of the balls in the recesses opening at one side of the ring and the other balls in the recesses opening at the other side of the ring positively retain the ring in position, as the balls at one side thereof prevent its displacement in one direction and the balls at the other side thereof prevent its displacement in the opposite direction. It will further be observed that the only function performed by the laterally projecting lugs is to prevent the possibility of any of the balls on the side of the retainer ring adjacent the feed grooves a' b' from rolling through such feed grooves should they come into register simultaneously with the registration with them of one of the balls. The lugs which project to the opposite side of the retainer ring from the feed grooves a', b' are unnecessary, as the balls in the recesses on such side of the ring cannot possibly become disengaged from the retainer ring or from the bearing rings. It is, however, desirable to provide the laterally projecting lugs on both sides of the retainer ring for convenience in assembling, so as to avoid the possibility of the retainer ring being located with the lugs projecting at the opposite side thereof from the feed groove. In other words, the provision of the lugs at both sides of the retainer ring permits either side of the ring to be located adjacent the free grooves.

From the foregoing description it will be observed that I have invented an improved retainer ring for ball bearings, which is exceedingly simple in construction and convenient of manufacture and which may be readily assembled with the balls, and when so assembled will space them apart and permit them to freely revolve. It will be further observed that I have invented an improved method of assembling a retainer ring and the balls spaced thereby in operative relation with the bearing rings, by the practice of which the ball bearings may be conveniently located in operative relation with the bearing rings and the balls securely retained in proper spaced relation between the bearing rings.

I claim:—

A cast metal retainer ring for ball bearings comprising semi-circular ball seats, alternate seats opening at one side of the ring, and intermediate seats opening at the other side of the ring, the ends of all of said seats being in circular alinement with each other, and lugs on the opposite sides of the ring, alternate lugs extending in opposite directions, one projecting tangentially at one side of each seat and of a length to be bent into a continuation of the adjacent seat to closely surround the surface of the ball seated therein to a distance of more than 90°.

In testimony whereof, I have subscribed my name.

ULYSSES G. ROGERS.

Witnesses:
 Geo. L. Wilkinson,
 Henry A. Parks.